(12) United States Patent
Mizusaki et al.

(10) Patent No.: US 11,048,125 B2
(45) Date of Patent: Jun. 29, 2021

(54) LIQUID CRYSTAL CELL AND LIQUID CRYSTAL DISPLAY DEVICE

(71) Applicant: SHARP KABUSHIKI KAISHA, Sakai (JP)

(72) Inventors: Masanobu Mizusaki, Sakai (JP); Kiyoshi Minoura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 59 days.

(21) Appl. No.: 16/359,091

(22) Filed: Mar. 20, 2019

(65) Prior Publication Data

US 2019/0302540 A1 Oct. 3, 2019

Related U.S. Application Data

(60) Provisional application No. 62/649,585, filed on Mar. 29, 2018.

(51) Int. Cl.
*G02F 1/1337* (2006.01)
*G02F 1/13357* (2006.01)
(Continued)

(52) U.S. Cl.
CPC ........ *G02F 1/133723* (2013.01); *C09K 19/56* (2013.01); *G02F 1/137* (2013.01);
(Continued)

(58) Field of Classification Search
CPC ............ C09K 2323/00; C09K 2323/02; C09K 2323/027; C09K 19/56; G02F 1/133723;
(Continued)

(56) References Cited

U.S. PATENT DOCUMENTS

2010/0213423 A1* 8/2010 Shiau ..................... C09K 19/56
                                                                      252/589
2012/0249940 A1* 10/2012 Choi ..................... G02F 1/1337
                                                                      349/123
(Continued)

FOREIGN PATENT DOCUMENTS

CN    104737068 A    6/2015
CN    107615144 A    1/2018
(Continued)

*Primary Examiner* — Ruiyun Zhang
(74) *Attorney, Agent, or Firm* — ScienBiziP, P.C.

(57) ABSTRACT

A liquid crystal cell includes a color filter substrate, an array substrate, a liquid crystal layer, and two alignment control layers. The color filter substrate includes a color conversion layer for converting color of light but not include an alignment film containing polyamic acid or polyamide. The array substrate is opposed to the color filter substrate. The alignment control layers are formed on an inner surface of the color filter substrate and an inner surface of the array substrate, respectively. The alignment control layers contact the liquid crystal layer. The alignment control layers are made of reactants of radical polymerizable monomers added to a liquid crystal material for forming the liquid crystal layer. The alignment control layers control orientations of liquid crystal molecules in the liquid crystal layer. The radical polymerizable monomers include radical polymerizable monomers having ultraviolet-ray absorbing functional groups.

9 Claims, 4 Drawing Sheets

(51) Int. Cl.
  *G02F 1/1335* (2006.01)
  *G02F 1/137* (2006.01)
  *C09K 19/56* (2006.01)

(52) U.S. Cl.
  CPC .. *G02F 1/133528* (2013.01); *G02F 1/133617* (2013.01); *C09K 2323/00* (2020.08); *C09K 2323/02* (2020.08); *G02F 1/13706* (2021.01); *G02F 1/13712* (2021.01); *G02F 1/133715* (2021.01); *G02F 1/133738* (2021.01); *G02F 1/133742* (2021.01)

(58) Field of Classification Search
  CPC ......... G02F 1/133528; G02F 1/133617; G02F 2001/133715; G02F 2001/133738; G02F 2001/133742; G02F 2001/13706; G02F 2001/13712

USPC ................ 428/1.1, 1.2, 1.23, 1.25; 349/123; 252/589
  See application file for complete search history.

(56) References Cited

U.S. PATENT DOCUMENTS

| | | |
|---|---|---|
| 2016/0170269 A1 | 6/2016 | Noma et al. |
| 2016/0195774 A1 | 7/2016 | Lee et al. |
| 2017/0066969 A1 | 3/2017 | Tsai |
| 2017/0123275 A1 | 5/2017 | Noma et al. |
| 2017/0210994 A1* | 7/2017 | Lim ................. G02F 1/134309 |
| 2018/0149927 A1 | 5/2018 | Mizusaki et al. |

FOREIGN PATENT DOCUMENTS

| | | |
|---|---|---|
| JP | 2016-126352 A | 7/2016 |
| JP | 2017-054119 A | 3/2017 |

* cited by examiner

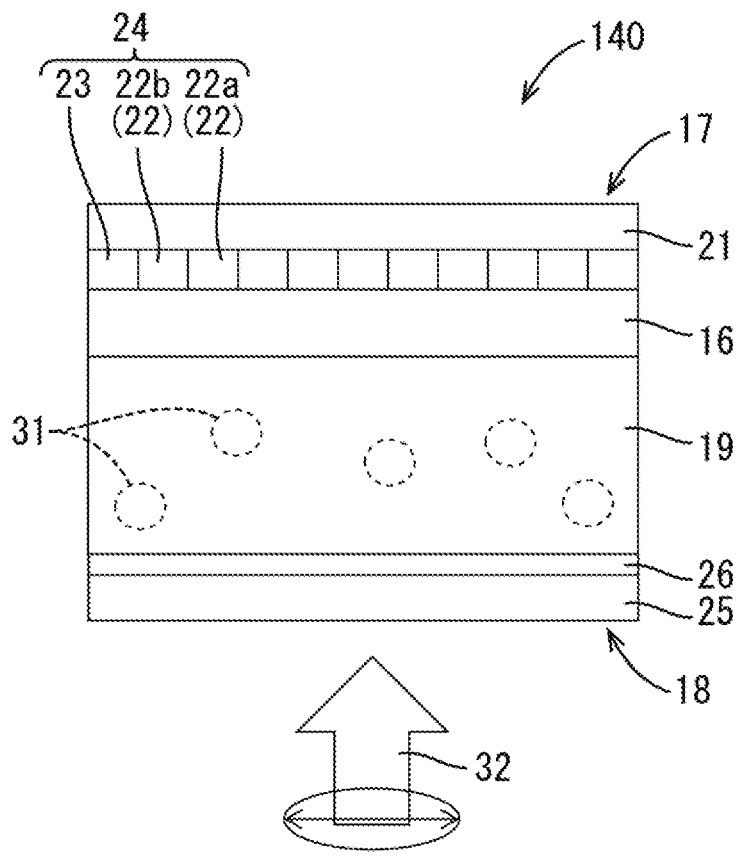
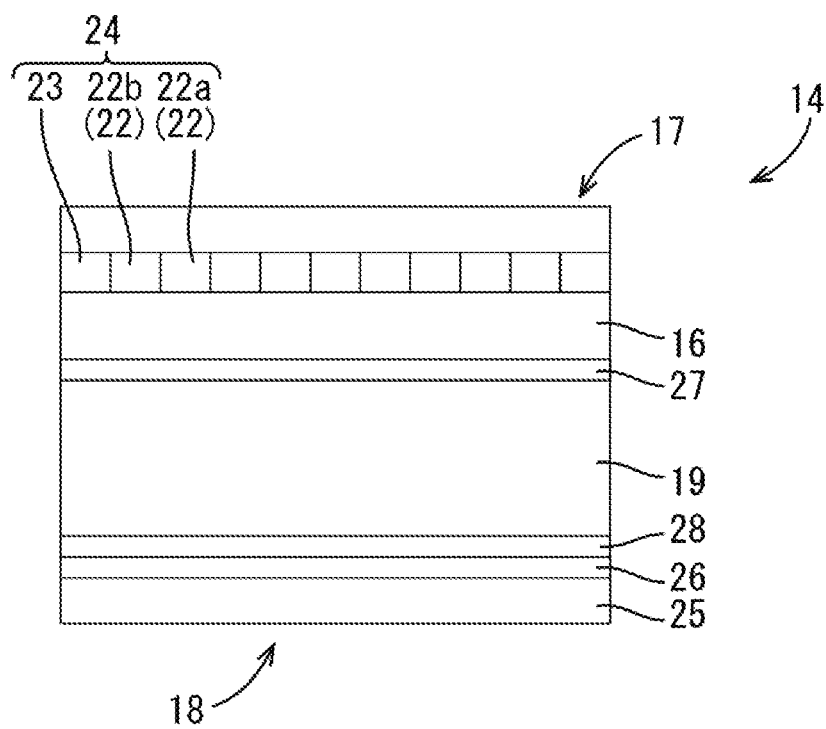

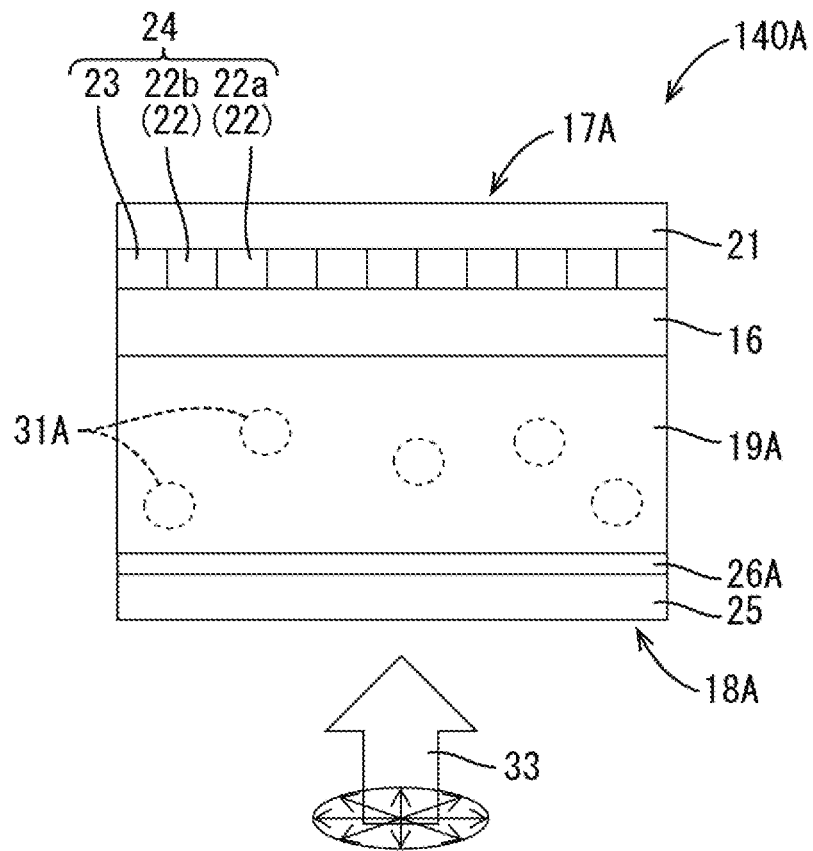
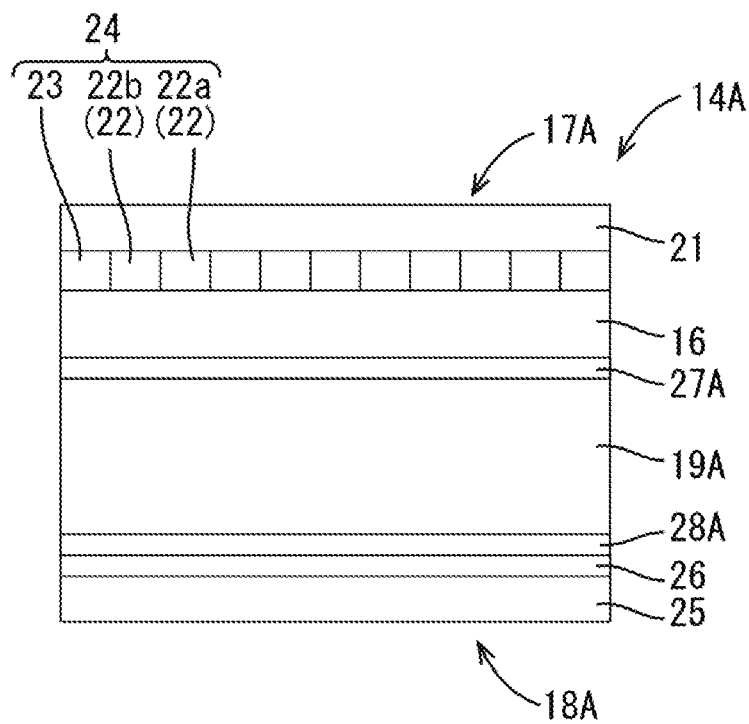

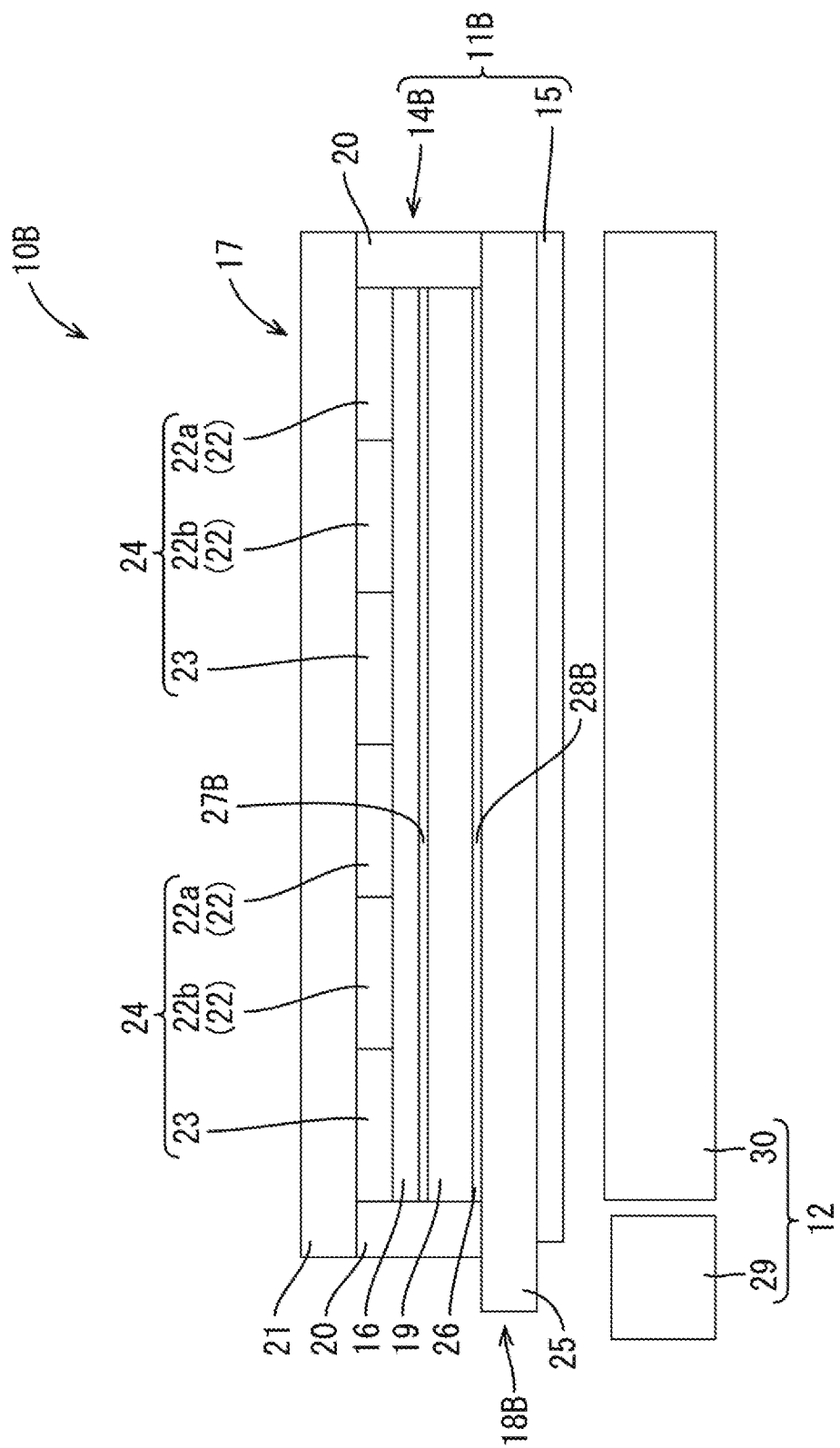

LIQUID CRYSTAL CELL AND LIQUID CRYSTAL DISPLAY DEVICE

This application claims priority from U.S. Provisional Application No. 62/649,585 filed on Mar. 29, 2018. The entire contents of the priority application are incorporated herein by reference.

TECHNICAL FIELD

The present invention relates to a liquid crystal cell and a liquid crystal display device.

BACKGROUND

The liquid cell of a liquid crystal display device is provided with a color filter substrate in which a colored layer is formed on a transparent substrate. The colored layer is provided with a red colored layer, a green colored layer and a blue colored layer, and each of these is constituted by a transparent resin layer in which a pigment or the like corresponding to each of the colors is dispersed. When light (white light) from a back light device installed in the liquid crystal display device is supplied thereto, the red colored layer allows red light to transmit, the green coloring agent allows green light to transmit and the blue colored layer allows blue light to transmit.

In recent years, a color filter substrate which in place of the colored layers of these color filter substrates, a color conversion layer and a transparent layer are utilized has been proposed. For example, Patent Literature 1 has proposed a color filter substrate in which a color conversion layer formed by dispersing quantum dots (Quantum Dot) in a transparent resin layer is utilized. The color conversion layer is constituted by a red conversion layer and a green conversion layer, and by utilizing these color conversion layers together with a transparent layer, color tones of the respective pixels in the liquid crystal cell are represented. When blue light is supplied thereto from the back light device, red light is emitted from the red conversion layer, green light is emitted from the green conversion layer, and blue light, as it is, is emitted from the transparent layer.

By the way, on each of the surfaces of the color filter substrate and an array substrate that is opposed to the color filter substrate with a liquid crystal layer interposed therebetween, an alignment film for controlling the pre-tilt angle of liquid crystal molecules is formed. The alignment film of this type is made of, for example, a thin film of apolyimide-basedresin. As an alignment agent for forming such an alignment film, Patent Literature 2 has described that together with a tetracarboxylic acid di-anhydride component and a diamine component, an epoxy group containing benzotriazole compound is used. Patent Literature 2 has described that when such an alignment agent is baked at a temperature in a range of 40 to 200° C., an alignment film can be formed. Moreover, it has described that such an alignment film makes it possible to alleviate the problem of an excessive ionic density under high-temperature and high-humidity environment.

Patent Literature 1: JP-A No. 2016-126352
Patent Literature 2: JP-A No. 2017-54119

The quantum dot is normally used in a state where on the periphery of a core made of cadmium selenide (CdSe), cadmium sulfide (CdS) or the like, a capping agent made of a low molecule organic compound is adsorbed. This capping agent is not necessarily chemically bonded to the core, but is adhered to the core by a weak interaction. For this reason, the capping agent tends to be easily separated from the core due to influences of heat. For example, in the film-forming process of the alignment film, when a color filter substrate including the quantum dots is heated at 200° C. or more, the capping agent is easily separated from the core of the quantum dot. When the capping agent is separated, the quantum dots are not uniformly dispersed in a resin layer to be aggregated, with the result that the quantum efficiency is lowered by influences of self light extinction. That is, when the capping agent is separated, an appropriate color conversion cannot be carried out in the color conversion layer, with the result that an image to be displayed in the liquid crystal cell cannot be represented by appropriate color tones.

Moreover, if one portion of the separated capping agent is infiltrated into the liquid crystal layer during use of the liquid crystal cell, the voltage holding rate (VHR) of the liquid crystal cell is lowered due to influences of the capping agent, with the result that its reliability might be lowered. Generally, the capping agent of this type is provided with a carboxyl group to be introduced into the core as an adsorption site together with an alkyl group. The carboxyl group has an ionic property; therefore, when the capping agent having such a functional group is infiltrated into the liquid crystal layer, its VHR is caused to be lowered.

Moreover, in the case of a color filter substrate using the quantum dots, blue light is supplied from the back light device, as described above. The back light device of this type uses a blue LED as a light source for blue light. The blue LED emits ultraviolet light together with the blue light. For this reason, when strong blue light and ultraviolet light from the back light device are continuously exposed onto the liquid crystal layer, the liquid crystal material in the liquid crystal layer deteriorates more quickly to cause degradation in the reliability of the liquid crystal cell, in comparison with a conventional back light device utilizing white light.

Additionally, in the Patent Literature 2, although an epoxy group containing benzotriazole compound is introduced into the alignment film, no consideration is completely given to the use of a color conversion layer using quantum dots in a color filter substrate. For this reason, in the alignment film of Patent Literature 2, a baking treatment is carried out under temperature conditions that cause degradation in the quantum dots (cause separation in the capping agent).

SUMMARY

The present invention relates to a liquid crystal cell that utilizes a color filter substrate having a color conversion layer and a liquid crystal display device provided with the liquid crystal cell, and the object of the present invention is to suppress degradation in the reliability thereof.

The liquid crystal cell of the present invention includes a color filter substrate, an array substrate, a liquid crystal layer, and two alignment control layers. The color filter substrate includes a color conversion layer for converting the color of light but not an alignment film containing polyamic acid or polyimide, which requires a heating process during formation. The array substrate is opposed to the color filter substrate that is disposed such that the color conversion layer in on an inner side. The liquid crystal layer is interposed between the color filter substrate and the array substrate. The liquid crystal layer includes liquid crystal molecules. The alignment control layers are formed on an inner surface of the color filter substrate and an inner surface of the array substrate, respectively. The alignment control layers contact the liquid crystal layer. The alignment control layers are made of reactants of radical polymerizable monomers added to the liquid crystal material for forming the liquid crystal layer. The alignment control layers control orientations of the liquid crystal molecules. The radical polymerizable monomers include radical polymerizable monomers having ultraviolet-ray absorbing functional groups.

In the liquid crystal cell, the color conversion layer includes a red color conversion layer that contains quantum dots for converting blue light to red light and a green color conversion layer that contains quantum dots for converging blue light to green light. The color filter substrate may include not only the red conversion layer and the green conversion layer but also a transparent layer that transmits blue light without conversion.

In the liquid crystal cell, the array substrate may include an alignment film disposed below the alignment control layer. The alignment film may contain polyamic acid or polyimide.

In the liquid crystal cell, the alignment film may include a light aligning functional group, or a vertical aligning functional group, or an ultraviolet-ray absorbing agent.

In the liquid crystal cell, the ultraviolet-ray absorbing agent may be a benzotriazole-based compound.

The radical polymerizable monomer may contain a radical polymerizable monomer having a horizontal aligning light functional group or a vertical aligning functional group.

In the liquid crystal cell, the horizontal aligning light functional group may be a functional group having a chalcone group or an azobenzene group.

In the liquid crystal cell, the radical polymerizable monomer including the vertical aligning functional group may be a compound expressed by the following chemical formula (1):

[C1]

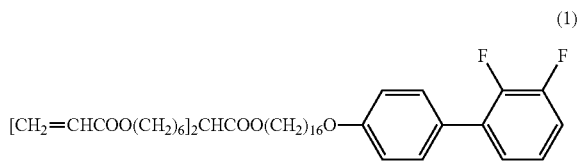

(1)

In the liquid crystal cell, the ultraviolet ray absorbing functional group may be a radical polymerizable monomer having a benzotriazole group.

In the liquid crystal cell, the radical polymerizable monomer having a benzotriazole group may be a compound expressed by the following chemical formula (2-1) and chemical formula (2-2).

[C2]

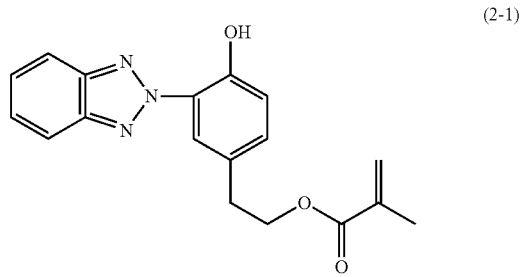

(2-1)

-continued

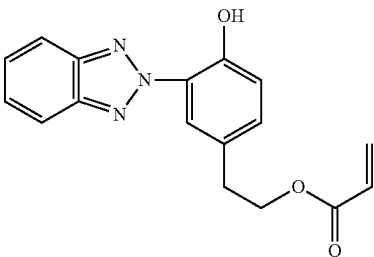

(2-2)

In the liquid crystal cell, the color filter substrate may include a transparent support substrate, the color conversion layer disposed on the support substrate and a polarizing layer disposed on the color conversion layer. The liquid crystal cell may further include a polarizing plate that is disposed outer than the array substrate and used in a pair with the polarizing layer.

A liquid crystal display device according to the present invention include the liquid crystal cell described above and a backlight device that includes a light source configured to emit blue light for supplying the blue light to the liquid crystal cell.

In accordance with the present invention, in the liquid crystal cell that includes the color filter substrate that includes the color conversion layer and in the liquid crystal display device that includes the liquid crystal cell, the reliability is less likely to be reduced.

BRIEF DESCRIPTION OF THE DRAWINGS

FIG. 2 is an explanatory view that schematically shows a process where light is applied to a stacked body constituted by a CF substrate and an array substrate that are bonded to each other, with a liquid crystal layer interposed therebetween.

FIG. 3 is an explanatory view that schematically shows a state where an alignment control layer is formed on a liquid crystal cell.

FIG. 4 is an explanatory view that schematically shows a process where light is applied to a stacked body of a second embodiment constituted by a CF substrate and an array substrate that are bonded to each other, with a liquid crystal layer interposed therebetween.

FIG. 5 is an explanatory view that schematically shows a state where an alignment control layer is formed on a liquid crystal cell relating to the second embodiment.

FIG. 6 is an explanatory view that schematically shows a configuration of a liquid crystal display device relating to a third embodiment.

DETAILED DESCRIPTION

First Embodiment

Figure 1:
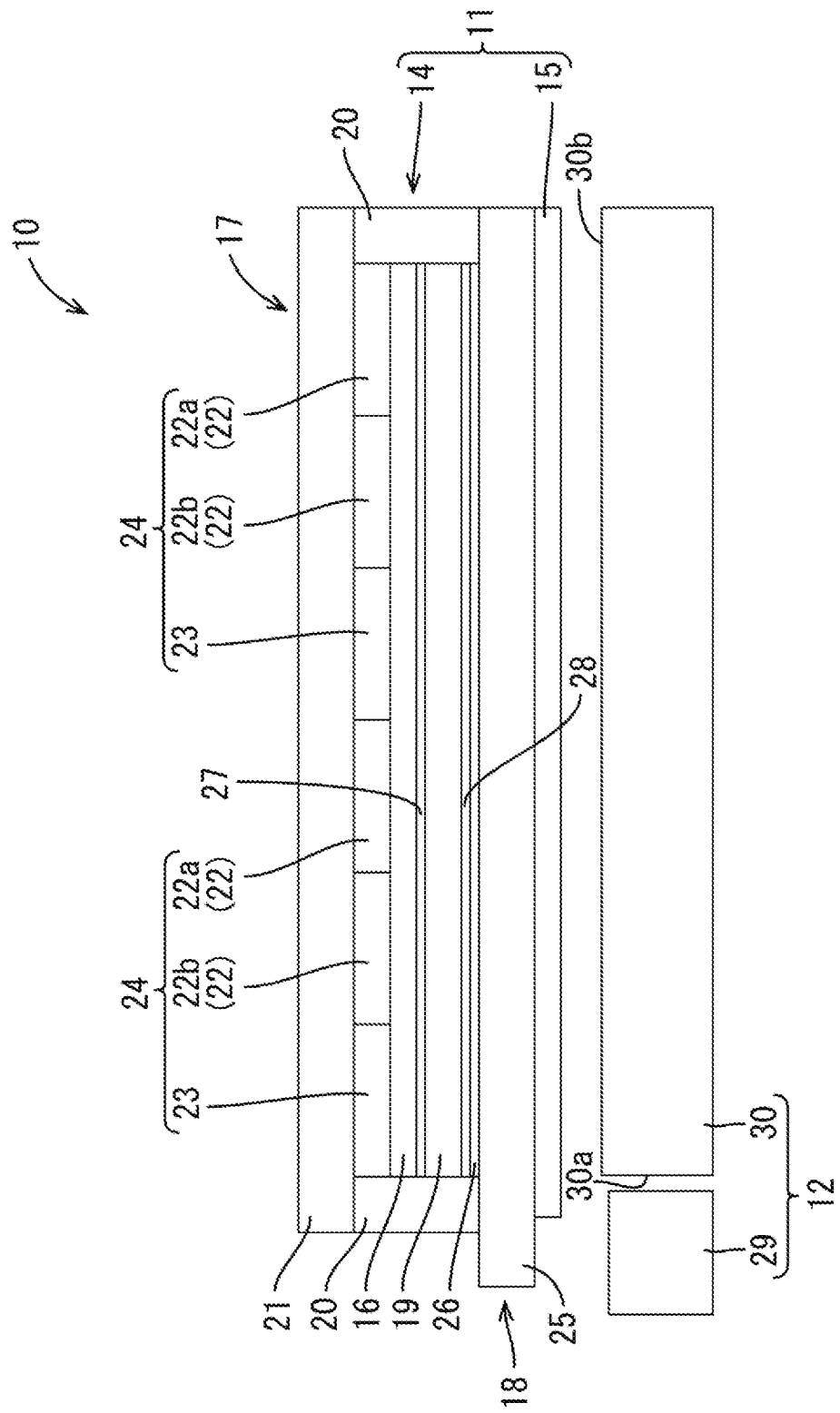
FIG. 1 is an explanatory view that schematically shows a configuration of a liquid crystal display device relating to a first embodiment.

A first embodiment of the present invention will be described with reference to FIGS. 1 to 3. FIG. 1 is an explanatory view that schematically shows a configuration of a liquid crystal display device 10 in accordance with a first embodiment. The liquid crystal display device 10 is mainly provided with a liquid crystal panel 11 and a back light device 12 that supplies blue light to the liquid crystal panel 11.

The liquid crystal panel 11 is mainly provided with a liquid crystal cell 14 and a polarizing plate 15 that is affixed to the one surface of the liquid crystal cell 14. Additionally, a polarizing layer (polarizing plate) 16, which is on the other side and forms a pair with the polarizing plate 15, is disposed inside the liquid crystal cell 14, as will be described later.

Liquid Crystal Cell 14

The liquid crystal cell 14 is mainly provided with a pair of a color filter substrate (hereinafter, referred to as CF substrate) 17 and an array substrate 18 that are opposed to each other, a liquid crystal layer 19 that is interposed between these substrates 17 and 18, and a seal member 20 that is interposed between the substrates 17 and 18 in a manner so as to surround the periphery of the liquid crystal layer 19.

The CF substrate 17 is constituted by a transparent support substrate (for example, glass substrate) 21 on one side of which a plurality of color conversion layers 22, a plurality of transparent layers 23, a polarizing layer 16 and the like are formed. The color conversion layer 22 is a layer having a function for converting the color of light (blue light) (that is, for conversing a wavelength of light) supplied from the back light device 12, and is constituted by dispersing quantum dots in a transparent resin.

The color conversion layer 22 is provided with a red conversion layer 22a formed by dispersing quantum dots for converting blue light into red light in a transparent resin and a green conversion layer 22b formed by dispersing quantum dots for converting blue light into green light in a transparent resin. The quantum dots to be used for the color conversion layer 22 are made of a II-VI family compound, a III-V family compound, a IV-VI family compound, a IV family element, a IV family compound or a material made of combining these with one another.

In particular, the quantum dot of the present embodiment is formed by adsorbing a capping agent on the surface of a core made of cadmium selenide (CdSe), cadmium sulfide (CdS), cadmium telluride (CdTe) or the like. The capping agent is made of, for example, a low molecular organic compound provided with an alkyl base and a carboxyl group introduced thereto as an adsorbing site to the core. The quantum dot with a capping agent adhered to the core is available from, for example, Sigma Aldrich Japan Corporation, etc. Additionally, as the quantum dot, a so-called core-shell type quantum dot formed by coating the surface layer of the core with ZnS or the like, may be utilized.

The transparent layer 23, which is made of a transparent resin, contains no fluorescent material such as quantum dots, and allows blue light, as it is, to transmit therethrough.

The red conversion layer 22a, the green conversion layer 22b and the transparent layer 23 constitute a set of color tone adjusting part 24, and a plurality of the color tone adjusting parts 24 are installed so as to be assigned to each of pixels (picture elements) of the liquid crystal cell 14. Additionally, the red conversion layer 22a, the green conversion layer 22b and the transparent layer 23 are partitioned by a lattice-shaped black matrix, not shown.

The polarizing layer 16 has a function for allowing only the light polarized in a specific direction to transmit, and is installed so as to cover the color tone adjusting part 24 constituted by the color conversion layer 22 and the transparent layer 23. The polarizing layer 16 is disposed inside the liquid crystal cell 14. The polarizing layer 16 is made, for example, by forming a polymer resin having an azo-based colorant into a film, and the resulting film is irradiated with a polarizing UV ray. As the polarizing layer 16, for example, a wire grid polarizing plate (polarizing layer) that is utilized in the liquid crystal cell 14 may be used.

Additionally, the CF substrate 17 is not provided with an alignment film (for example, a polyimide based alignment film made of polyamic acid or polyimide) that requires a heating treatment (for example, heating treatment under a temperature condition of 200° C. or more) at the time of formation. Since the CF substrate 17 uses quantum dots that are easily influenced by a heating treatment for the color conversion layer 22, it is not desirable to form a polyimide based alignment film made of polyamic acid or polyimide thereon. Additionally, the polyamic acid is a precursor of polyimide, and when the polyamic acid is imidized, polyimide is formed. In the present specification, "polyimide" is supposed to include materials imidized at various imidizing ratios.

The array substrate 18 is constituted by forming a plurality of thin-film transistors (TFT: Thin Film Transistor), a plurality of pixel electrodes and the like on one surface side of a transparent support substrate (glass substrate) 25. The pixel electrode is made of a transparent conductive film such as ITO (Indium Tin Oxide).

The array substrate 18 in the present embodiment has a configuration in which on its surface facing the liquid crystal layer 19, the polyimide based alignment film 26 made of polyamic acid or polyimide is formed so as to cover the TFT and the like. Additionally, the array substrate 18 has a configuration in which the color conversion layer 22 is opposed to the color filter substrate 17, with the color conversion layer 22 being disposed on the inside thereof (on the liquid crystal layer 19 side). Additionally, the polymer forming the alignment film 26 may have a light aligning functional group, or may have a vertical aligning functional group, if necessary. The light aligning functional group is a functional group that exerts an aligning property upon receipt of light, such as ultraviolet rays or the like, and the vertical aligning functional group is a functional group that reacts with liquid crystal molecules so that the liquid crystal molecules are vertically aligned relative to the substrate surface.

The liquid crystal layer 19 is constituted by a liquid crystal material containing liquid crystal molecules. As the liquid crystal material, normally, a nematic liquid crystal material containing thin, long organic molecules. As the nematic liquid crystal material, a positive-type liquid crystal material that exerts a positive dielectric anisotropy whose dielectric constant is larger in the long axis direction and smaller in a direction orthogonal to the long axis direction (short axis direction), and a negative-type liquid crystal material that exerts a negative dielectric anisotropy whose dielectric constant is smaller in the long axis direction and larger in a direction orthogonal to the long axis direction (short axis direction).

In accordance with the liquid crystal alignment mode or the like of the liquid crystal cell 14 (liquid crystal panel 11), the liquid crystal material for use in the liquid crystal layer 19 is selected from known liquid crystal materials on demand, while adjusting various conditions, such as nematic-isotropic phase transition temperature (Tni), dielectric anisotropy (Δε), refractive index anisotropy (Δn) and the like. In the case when, for example, the liquid crystal alignment mode corresponds to a horizontal alignment mode, such as a fringe field switching (FFS: Fringe Field Switching) mode for applying a lateral electric field to the liquid crystal layer 19, with liquid crystal molecules being horizontally aligned relative to the substrate surface, a negative-type liquid crystal material or a positive-type liquid crystal material is utilized. Moreover, in the case when the liquid crystal alignment mode corresponds to a vertical alignment (VA: Vertical Alignment) mode in which liquid crystal molecules are vertically aligned relative to the substrate surface, a negative type liquid crystal material is utilized.

Additionally, in the case when the liquid crystal cell 14 corresponds to the horizontal alignment mode, common electrodes made of a transparent conductive film are formed on the array substrate 18 in addition to pixel electrodes. In this case, on the CF substrate 17, no electrodes made of a transparent conductive film are formed. In contrast, in the case when the liquid crystal cell 14 corresponds to the vertical alignment mode, on the array substrate 18, pixel electrodes are formed, and on the CF substrate 17 also, common electrodes (opposing electrodes) made of transparent conductive films are formed. Additionally, on each of the electrodes made of transparent conductive films, an alignment regulating structural member, such as a slit or the like, may be formed, if necessary.

The liquid crystal cell 14 of this type is further provided with an alignment control layer 27 and an alignment control layer 28 that are respectively formed on the inner surface of the CF substrate 17 and the inner surface of the array substrate 18. These paired alignment control layers 27 and 28 have functions for controlling the direction (alignment direction) of liquid crystal molecules in an unapplied state of voltage. The alignment control layers 27 and 28 are made of a reactant of a radical polymerizable monomer added to a liquid crystal material for forming the liquid crystal layer 19. In the case of the present embodiment, layers (polymer layers) made of polymers (reactants) derived from radical polymerizable monomers are formed as alignment control layers 27 and 28.

As the radical polymerizable monomer, for example, a monomer represented by the following chemical formula (3) is utilized.

[C3]

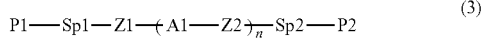

(3)

In formula (3), P1 and P2 are mutually independent polymerizable groups made of an acrylate group or a methacrylate group, Sp1 and Sp2 are mutually independent spacer groups, which are straight-chain type, cyclic type or branched-chain type saturated alkyl groups or unsaturated alkyl groups or direct bonds of carbon numbers of 1 to 24, Z1 and Z2 are mutually independent —O— group, —S— group, —CO— group, —COO— group, —OCO— group, or direct bonds, and Al represents any one of 1,4-phenylene group, 4,4'-bephenylene group, 2,6-naphthalene group, 2,6-anthracene group, 2,7-phenanthrene group, 4,4'-chalcone group and 4,4'-azobenzene group, and n represents any one of integers of 1 to 3.

As the radical polymerizable monomer, a radical polymerizable monomer with an initiator function added thereto, which has a function for generating radicals upon receipt of predetermined light (for example, polarizing ultraviolet rays), is desirably used. The radical polymerizable monomer having the initiator function of this type generates radicals, for example, by a photo Fries rearrangement reaction. Additionally, in the case when the monomer represented by the chemical formula (3) does not generate radicals, a radical polymerizable initiator may be added to the liquid crystal material.

Moreover, as the radical polymerizable monomer, a radical polymerizable monomer having a horizontal aligning light functional group or a radical polymerizable monomer having a vertical aligning functional group is utilized in accordance with the liquid crystal alignment mode or the like of the liquid crystal cell 14 (liquid crystal panel 11).

The horizontal aligning light functional group is a functional group that exerts an effect on liquid crystal molecules so as to horizontally align the liquid crystal molecules relative to the substrate surface. As the horizontal aligning light functional group, functional groups, such as, for example, a chalcone group, an azobenzene group or the like, are listed.

Moreover, the vertical aligning light functional group is a functional group that exerts an effect on liquid crystal molecules so as to vertically align the liquid crystal molecules relative to the substrate surface. As the radical polymerizable monomer having the vertical aligning functional group, for example, a chemical compound indicated by the following chemical formula (1) is listed.

[C4]

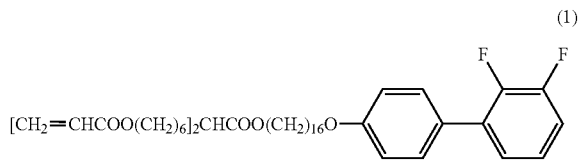

(1)

Additionally, the radical polymerizable monomer may contain a radical polymerizable monomer having an ultraviolet absorbing functional group. The back light device 12 is provided with a blue LED (light emitting diode) 29 for emitting blue light as a light source. The blue LED 29 normally emits ultraviolet rays together with blue light; therefore, in the case when strong blue light and ultraviolet rays from the back light device 12 continuously expose the liquid crystal layer 19, degradation of the liquid crystal material (liquid crystal molecules) starts more earlier than that in a conventional back light device utilizing white light, with the result that reliability of the liquid crystal cell 14 might be lowered. For this reason, as described earlier, by introducing a functional group (ultraviolet-ray absorbing functional group) having a function for absorbing ultraviolet rays into the polymer constituting the alignment control layers 27 and 28, ultraviolet rays from the back light device 12 are absorbed, thereby suppressing the degradation of the liquid crystal material (liquid crystal molecules).

As the radical polymerizable monomer having an ultraviolet-ray absorbing functional group, not particularly limited as long as the object of the present invention is not impaired, for example, a radical polymerizable monomer having a benzotriazole group is listed. Moreover, as the radical polymerizable monomer having a benzotriazole group, respective compounds indicated by the following chemical formula (2-1) and chemical formula (2-2) are listed.

[C5]

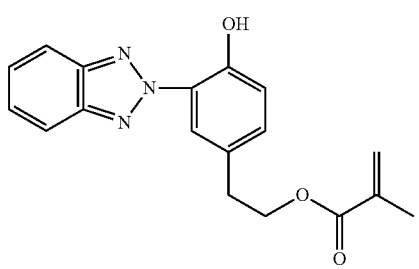

(2-1)

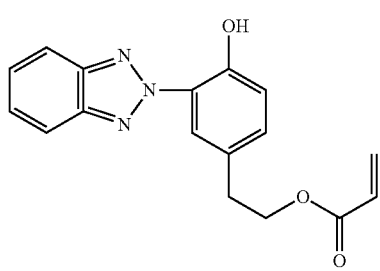

(2-2)

In this case, by reference to FIG. 2 and FIG. 3, explanation will be given on a formation method of the alignment control layers 27 and 28. Additionally, this case exemplifies a configuration in which the alignment control layers 27 and 28 for horizontally aligning liquid crystal molecules are formed. FIG. 2 is an explanatory view that schematically shows a process in which light 32 is applied to a stacked body 140 constituted by a CF substrate 17 and an array substrate 18 bonded to each other with a liquid crystal layer 19 interposed therebetween, and FIG. 3 is an explanatory view that schematically shows a state in which the alignment control layers 27 and 28 are formed on the liquid crystal cell 14. The liquid crystal layer 19 is formed by utilizing a liquid crystal material on which a radical polymerizable monomer 31 is added as an additive. For this reason, the radical polymerizable monomer 31 is present in the liquid crystal layer 19 of the stacked body 140. The liquid crystal material of this stacked body 140 is heated to a temperature higher than that of Tni, and when to the stacked body 140 in this state, a polarizing ultraviolet ray (light 32) is applied from the outside of the array substrate 18 on which the alignment film 26 is formed, the radical polymerizable monomer 31 (containing a radical polymerizable monomer having a horizontal aligning light functional group) is reacted to generate a polymer so that a film made of the polymer is formed on the inner surface (surface of a polarizing layer 16 that is adjacent to the liquid crystal layer 19) of the CF substrate 17 and the inner surface (surface of the alignment film 26 adjacent to the liquid crystal layer 19) of the array substrate 18 in a manner so as to be separated from the liquid crystal layer 19. The polymer films thus formed constitute the alignment control layers 27 and 28 having a horizontal aligning property, as shown in FIG. 3.

Additionally, at the time of allowing the alignment control layers 27 and 28 to exert the horizontal aligning property, by heating these at a temperature higher than Tni of the liquid crystal material, as described above, so that the liquid crystal material (liquid crystal molecules) is brought to an isotropic phase, light irradiation is desirably carried out thereon.

As described above, the array substrate 18 of the present embodiment is provided with the alignment film 26. The alignment film 26 is formed by utilizing an alignment agent made by mixing polyamic acid or polyimide in an uncured state with a predetermined organic solvent. The polymer for forming the alignment film 26 may be provided with a horizontal aligning light functional group, or may be provided with a vertical aligning functional group in accordance with the liquid crystal alignment mode or the like of the liquid crystal cell 14. Moreover, the polymer for forming the alignment film 26 may be provided with a light aligning functional group that reacts upon receipt of predetermined light (ultraviolet ray or the like) and exerts a horizontal aligning property or a vertical aligning property. In the present specification, such a state as to exert a function for horizontally aligning liquid crystal molecules relative to the substrate surface is referred to as "horizontal aligning property", and such a state as to exert a function for vertically aligning liquid crystal molecules relative to the substrate surface is referred to as "vertical aligning property".

Moreover, the alignment film 26 may contain an ultraviolet-ray absorbing agent. By adding the ultraviolet-ray absorbing agent into the alignment film 26, ultraviolet rays from the back light device 12 are absorbed, thereby making it possible to suppress degradation of the liquid crystal material (liquid crystal molecules). As the ultraviolet-ray absorbing agent to be utilized for the alignment film 26, not particularly limited as long as the object of the present invention is not impaired, for example, a benzotriazole-based compound may be listed. As the benzotriazole-based compound, for example, compounds indicated by the following chemical formula (6-1), chemical formula (6-2) and chemical formula (6-3) are listed.

[C6]

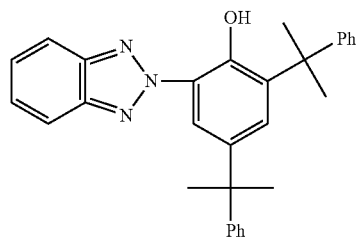

(6-1)

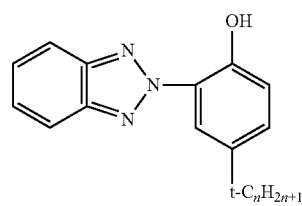

(6-2)

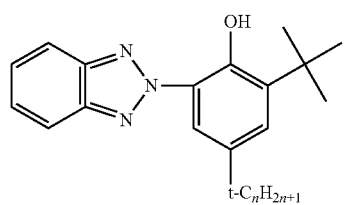

(6-3)

In the chemical formula (6-2) and chemical formula (6-3), n represents any one of integers from 1 to 16.

The back light device 12 is a so-called edge light-type device (or side light-type device), and provided with a blue LED 29 and a light introducing plate 30. The light introducing plate 30 is a plate-shaped member made of a transparent synthetic resin. The blue LED 29 is configured such that a light emitting surface 29a for emitting light is disposed so as to be opposed to an end face 30a of the light introducing plate 30. Light emitted from the light emitting surface 29a is made incident into the light introducing plate 30 from the end face 30a. The light made incident into the light introducing plate 30 is released from a plate face 30b on the surface side toward the liquid crystal panel 11 while propagating through the light introducing plate 30.

When blue light from the blue LED 29 is made incident into the liquid crystal panel 11 and further made incident into a red conversion layer 22a of the color tone adjusting part 24, the resulting light is converted to red light by the red conversion layer 22a so that the red light is released from the red conversion layer 22a. Moreover, when blue light is made incident into a green conversion layer 22b of the color tone adjusting part 24, it is converted into green light by the green conversion layer 22b so that the green light is released from the green conversion layer 22b. Moreover, when the blue light is made incident on the transparent layer 23 of the color tone adjusting part 24, it passes through the transparent layer 23 and is released from the transparent layer 23. In this manner, by utilizing light (red light, green light and blue light) released from the color tone adjusting part 24, the color tone of each of pixels (picture elements) of the liquid crystal cell 14 is represented. Additionally, one portion of the blue light made incident on the color conversion layer 22 is released as blue light, as it is, without being converted by the color conversion layer 22; however, in the present specification, explanation of such blue light will be omitted. Additionally, in another embodiment, a so-called direct-type back light device may be used.

As described above, in the liquid crystal display device 10 (liquid crystal cell 14) of the present embodiment, since quantum dots are utilized in the color conversion layer 22 of the CF substrate 17, an alignment film made of polyamic acid or the like, which requires a high-temperature baking treatment at the time of film formation, is not formed on the CF substrate 17. In the case of the liquid crystal cell 14 of the present embodiment, by utilizing the alignment control layers 27 and 28 that can be formed without the necessity of a heating treatment or the like causing degradation (in particular, separation of the capping agent) in the quantum dots, the alignment control of liquid crystal molecules can be carried out. For this reason, it becomes possible to suppress the capping agent from separating from the core of each quantum dot and the separated capping agent from infiltrating into the liquid crystal layer 19 or the like, thereby causing degradation of the VHR and degradation of the contrast of the liquid crystal panel 11.

Moreover, in the liquid crystal display device 10 (liquid crystal cell 14) of the present embodiment, it becomes possible to introduce a configuration (ultraviolet-ray absorbing functional group, ultraviolet-ray absorbing agent) provided with an ultraviolet-ray absorbing function into the polymer forming the alignment control layers 27 and 28, as well as into the alignment film 26 formed in the array substrate 18, respectively. Therefore, even when an ultraviolet ray is included in light supplied from the back light device 12, the influences of the ultraviolet ray (for example, degradation or the like of liquid crystal molecules due to the ultraviolet ray) can be suppressed by absorbing the ultraviolet ray.

In the liquid crystal display device 10 of the present embodiment, the array substrate 18 is disposed on a side closer to the back light device 12 of the liquid crystal cell 14 (liquid crystal panel 11), and on a side farther therefrom, the CF substrate 17 is disposed. In the case when in this manner, the color tone adjusting part 24 constituted by the color conversion layer 22 and the transparent layer 23 is disposed on the farther side from the back light device 12, it is possible to desirably obtain a higher light utilization efficiency and a wider viewing angle. Additionally, in another embodiment, as long as the object of the present invention is not impaired, a configuration in which the CF substrate is disposed on a side closer to the back light device 12 (configuration in which the color tone adjusting part constituted by the light conversion layer and the transparent layer) may be used.

Second Embodiment

Next, referring to FIG. 4 and FIG. 5, explanation will be given on a second embodiment of the present invention. FIG. 4 is an explanatory view that schematically shows a process where light 33 is applied to a stacked body 140A of the second embodiment constituted by a CF substrate 17A and an array substrate 18A that are bonded to each other, with a liquid crystal layer 19A interposed therebetween, and FIG. 5 is an explanatory view that schematically shows a state where an alignment control layers 27A and 28A are formed on the liquid crystal cell 14A relating to the second embodiment. In this case, explanation will be given on a case in which the alignment control layers 27A and 28A for vertically aligning liquid crystal molecules are formed.

Additionally, in FIG. 4 and FIG. 5, those configurations that are the same as those of the first embodiment are indicated by the same reference numerals, and explanations thereof will be omitted. Moreover, in FIG. 4 and FIG. 5, the configurations of the present embodiment corresponding to those of the first embodiment are indicated by using reference numerals used in the first embodiment to which a subscript "A" is further added. The CF substrate 17A and the array substrate 18A of the present embodiment are utilized for a vertical alignment mode, and on the inner surface of the array substrate 18A, a vertically aligning alignment film is formed. In the liquid crystal layer 19A (liquid crystal material) of the stacked body 140A having these CF substrate 17A and the array substrate 18A, a radical polymerizable monomer 31A serving as an additive is included. In the case when a non-polarizing ultraviolet ray is applied to this stacked body 14A from the outside of the array substrate 18A on which the alignment film 26A is formed, the radical polymerizable monomer (containing a radical polymerizable monomer having a vertical aligning functional group) 31A reacts to generate a polymer so that a film made of the polymer is formed on the inner surface (surface of the polarizing layer 16 adjacent to the liquid crystal layer 19A) of the CF substrate 17A and the inner surface (surface of the alignment film 26A adjacent to the liquid crystal layer 19A) of the array substrate 18A, in a manner so as to be separated from the liquid crystal layer 19A. The polymer film formed in this manner constitutes vertically aligning alignment control layers 27A and 28A as shown in FIG. 5.

Additionally, at the time of allowing the alignment control layers 27A and 28B to exert a vertical aligning property, light irradiation may be carried out at a temperature condition (for example, room temperature of 23° C.) of not more than the liquid crystal material Tni.

Third Embodiment

Next, referring to FIG. 6, explanation will be given on a third embodiment of the present invention. FIG. 6 is an explanatory view that schematically shows a configuration of a liquid crystal display device 10B relating to the third embodiment. Additionally, in FIG. 6, those configurations that are the same as those of the first embodiment are indicated by the same reference numerals, and explanations thereof will be omitted. Moreover, in FIG. 6, the configurations of the present embodiment corresponding to those of the first embodiment are indicated by using reference numerals used in the first embodiment to which a subscript "B" is further added. A liquid crystal display device 10B in the present embodiment is not provided with an alignment film made of polyamic acid or the like formed on the array substrate 18B provided on the liquid crystal cell 14B (liquid crystal panel 11B). That is, in the present embodiment, no alignment film made of polyamic acid or the like is formed on any of the CF substrate 17 and the array substrate 18B. In this liquid crystal cell 14B, an alignment control layer 27B made of a polymer film is formed on the inner surface (surface of the polarizing layer 16 adjacent to the liquid crystal layer 19) of the CF substrate 17 and an alignment control layer 28B also made of a polymer film is formed on the inner surface (surface adjacent to the liquid crystal layer 19) of the array substrate 18B. In this manner, the liquid crystal cell 14B (liquid crystal panel 11B), which has a configuration of a conventional type without an alignment film, may be used. Additionally, in this case, the configuration having an ultraviolet ray absorbing function is introduced into the alignment control layer.

EXAMPLES

Referring to examples, the following description will further explain the present invention in detail. Additionally, the present invention is not intended to be limited by these examples.

Example 1

An array substrate for an FFS mode in which a TFT, a pixel electrode, a common electrode and the like were formed on a glass substrate and a CF substrate for an FFS mode in which a light conversion layer containing quantum dots, a transparent layer, a polarizing layer inside the cell, and the like were formed on a glass substrate, were prepared. The pixel electrode and the common electrode of the array substrate were made of ITO, and an SiN insulating film was interposed between these.

The color conversion layer of the CF substrate was constituted by a red color conversion layer made of a material in which quantum dots for converting blue light into red light were dispersed in a transparent resin and a green color conversion layer made of a material in which quantum dots for converting blue light into green light were dispersed in a transparent resin. The quantum dots used for the respective color conversion layers were selected and prepared on demand from a II-VI family compound, a III-V family compound, a IV-VI family compound, a IV family element, and a IV family compound and those materials formed by combining these with one another. The transparent layer of the CF substrate was made of a transparent resin. Moreover, the polarizing layer inside the cell was made by forming a polymer resin having an azo-based colorant into a film and by irradiating the resulting film with a polarizing UV ray (inside cell wire grid polarizing plate). Additionally, the CF substrate was provided with no electrodes.

Of the pair of these substrates, onto only the inner surface side of the array substrate, a horizontal aligning alignment agent containing polyamic acid was applied by a spin coating method. The coated object was subjected to a temporary baking treatment in which it was baked at 90° C. for two minutes, and successively subjected to a main baking treatment in which it was baked at 200° C. for 20 minutes. Thereafter, a rubbing treatment was carried out on the coated object so that an alignment film (polyamic acid-based horizontal alignment film) was formed on the array substrate.

Successively, on the inner surface side of the array substrate, a seal member for ODF (One Drop Fill) in an uncured state (ultraviolet-ray curing seal member) was drawn in a lattice shape by utilizing a dispenser. Next, a negative-type liquid crystal material containing a monomer to be described later was dripped at predetermined positions on the inner surface side of the CF substrate.

The negative-type liquid crystal material containing a monomer contained a monomer having a chalcone group indicated by the following chemical formula (7) at a rate of 1.2% by mass. Moreover, the nematic-isotropic phase transition temperature (Tni) of the negative-type liquid crystal material containing a monomer was adjusted to 85° C., A thereof was adjusted to −3.5 and Δn thereof was adjusted to 0.095.

[C7]

(7)

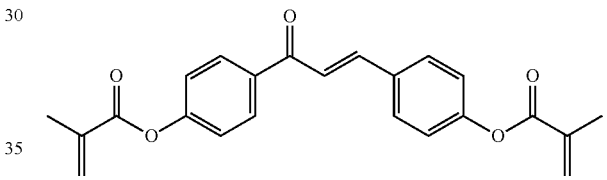

Next, the array substrate and the CF substrate were bonded to each other under vacuum to form a stacked body, and by irradiating the seal member of the stacked body with ultraviolet ray, the seal member was optically cured. Successively, from the outside of the array substrate, the stacked body was irradiated with a polarizing UV ray under a condition of 5 J/cm² (wavelength: 365 nm) in a heated state of the stacked body at 95° C. so that horizontal aligning control layers were respectively formed on the inside of the array substrate and the inside of the CF substrate, thereby obtaining a liquid crystal cell for the FFS mode. By affixing a polarizing plate onto the outside of the array substrate of the liquid crystal cell, a liquid crystal panel of example 1 was manufactured.

Example 2

The same processes as those of example 1 were carried out except that no polyamic acid-based horizontal alignment film was formed on the array substrate (that is, none of the substrates had alignment films formed thereon), thereby manufacturing a liquid crystal panel.

Comparative Example 1

The same processes as those of example 1 were carried out except that no polyamic acid-based horizontal alignment film was formed on the two substrates and that no horizontal alignment control layer was formed on the two substrates (that is, no monomer for horizontal alignment control layer was added to the negative type liquid crystal material) so that a liquid crystal panel was formed.

High Temperature Holding Test

The liquid crystal panel of the example 1 or the like was held under an environment of 70° C. for 1000 hours, and before and after this process (at the test initiation time and 1000 hours after the test initiation time), the contrast and voltage holding ratio (VHR: Voltage Holding Ratio) of the liquid crystal panel were measured. The measurement of the contrast was carried out under an environment of 25° C. by using a Topcon UL-1. Moreover, the measurement of the voltage holding ratio was carried out under environments of 1V at 70° C. by using a VHR measuring system of type 6254 (made by Toyo Corporation). The results were shown in Table

TABLE 1

|  | 0 HOUR | | 1000 HOURS LATER | |
| --- | --- | --- | --- | --- |
|  | CONTRAST | VHR (%) | CONTRAST | VHR (%) |
| EXAMPLE 1 | 1150 | 99.3 | 1050 | 98.2 |
| EXAMPLE 2 | 1170 | 99.1 | 1030 | 97.8 |
| COMPARATIVE EXAMPLE 1 | 1020 | 96.4 | 880 | 92.3 |

In examples 1 and 2, the VHR at the test initiation time (0 hour) was 99% or more, and after held for 1000 hours under a condition of 70° C., the VHR showed about 98%. In contrast, in comparative example 1, the VHR at the test initiation time (0 hour) was about 96% which was a low value, and after held for 1000 hours under a condition of 70° C., the VHR was further lowered. This is presumably because since at the time of forming a polyamic acid-based alignment film on the CF substrate on which quantum dots were formed, a baking treatment at 200° C. was carried out, the capping agent of the quantum dots was separated from the core and one portion thereof was infiltrated into the alignment film, and was further infiltrated into the liquid crystal layer. Another possibility was that since at the test initiation time (0 hour), the contrast of the comparative example showed a value lower than those of the examples 1 and 2, an azo-based pigment forming the inside cell polarizing layer formed on the CF substrate was infiltrated into the polyamic acid-based alignment film and the liquid crystal layer. As the results described above, since no polyamic acid-based alignment film that requires a high-temperature baking treatment at 200° C. or more on the CF substrate side using quantum dots, it becomes possible to design a liquid crystal cell (liquid crystal panel) of FFS mode provided with a CF substrate using quantum dots having high vales in contrast and VHR.

Example 3

The same array substrate for the FFS mode as that of example 1 and a CF substrate for the FFS mode using quantum dots were prepared. Of these paired substrates, only on the inner surface side of the array substrate, an alignment agent to be described below was applied by using a spin coat method. The alignment agent includes polyamic acid containing azobenzene as a light functional group and is formed by adding an ultraviolet absorbing agent indicated by the following chemical formula (8) at a rate of 10% by mass relative to the entire solid component.

[C8]

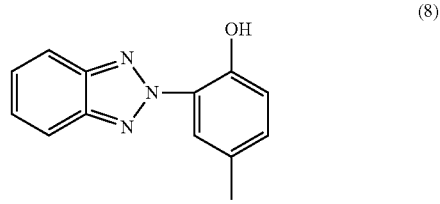

(8)

Next, a temporary baking treatment for heating the coated object at 90° C. for two minutes was carried out, and successively, a main baking treatment at the first time for heating at 120 for 20 minutes was carried out. Thereafter, by irradiating the coating object with the linear polarizing light from a direction (normal direction) vertical to the array substrate under a condition of 2 J/cm$^2$, the coated object was subjected to a light aligning treatment. Thereafter, the coated object was subjected to a main baking treatment at the second time for heating at 230° C. for 40 minutes. In this manner, a polyamic acid-based horizontal alignment film (horizontal light alignment film) containing an ultraviolet absorbing agent was formed on the inner surface side of the array substrate.

Successively, on the inner surface side of the array substrate, a seal member for ODF (One Drop Fill) in an uncured state (ultraviolet-ray curing seal member) was drawn in a lattice shape by utilizing a dispenser. Next, the same negative-type liquid crystal material containing a monomer as that of example 1 was dripped at predetermined positions on the inner surface side of the CF substrate.

Thereafter, the array substrate and the CF substrate were bonded to each other under vacuum to form a stacked body, and by irradiating the seal member of the stacked body with ultraviolet ray, the seal member was optically cured. Successively, from the outside of the array substrate, the stacked body was irradiated with a polarizing UV ray under a condition of 5 J/cm$^2$ (wavelength: 365 nm) in a heated state of the stacked body at 95° C. so that horizontal aligning control layers were respectively formed on the inside of the array substrate and the inside of the CF substrate, thereby obtaining a liquid crystal cell for the FFS mode of example 3. By affixing a polarizing plate onto the outside of the array substrate of the liquid crystal cell, a liquid crystal panel of example 3 was manufactured. Additionally, by making the polarizing direction of the linear polarizing light irradiated at the time of the light aligning process and the polarizing direction of a polarizing UV ray that was irradiated for a monomer polymerization in the liquid crystal layer the same as each other, the aligning direction of the liquid crystal molecules in the liquid crystal layer was set to one direction.

Examples 4 and 5 as Well as Comparative Examples 2 and 3

The same processes as those of example 3 were carried out except that the amount of addition of an ultraviolet ray absorbing agent indicated by the chemical formula (8) was altered to values indicated by table 2 so that respective alignment agents of examples 4 and 5 as well as comparative examples 2 and 3 were manufactured. Moreover, the same processes as those of example 3 were carried out except that in place of the alignment agent of example 3, the respective alignment agents of examples 4 and 5 as well as comparative examples 2 and 3 were used so that liquid crystal panels of examples 4 and 5 as well as comparative examples 2 and 3 were manufactured.

Blue LED Exposure Test

A back light device of an edge light device using a blue LED was prepared as a light source, and exposure by the light from the back light device was performed on the liquid crystal panel of example 3 or the like for 1000 hours, and before and after this process (at the test initiation time and 1000 hours after the test initiation time), the contrast and voltage holding ratio (VHR) of the liquid crystal panel were measured. Light from the back light device was made incident on the array substrate side of the liquid crystal panel. The results were shown in table 2. Additionally, the measurements of the contrast and the VHR were carried out by using the same devices as those of the example 1. The same is true for examples or the like to be described later.

TABLE 2

| | AMOUNT OF INTRODUCTION (wt %) OF ULTRAVIOLET-RAY ABSORBING AGENT OF CHEMICAL FORMULA (8) | 0 HOUR | | 1000 HOURS LATER | |
|---|---|---|---|---|---|
| | | CONTRAST | VHR (%) | CONTRAST | VHR (%) |
| COMPARATIVE EXAMPLE 2 | 0 | 1400 | 99.3 | 1100 | 92.0 |
| EXAMPLE 3 | 10 | 1440 | 99.3 | 1350 | 96.4 |
| EXAMPLE 4 | 20 | 1430 | 99.2 | 1360 | 97.7 |
| EXAMPLE 5 | 30 | 1440 | 99.2 | 1350 | 98.0 |
| COMPARATIVE EXAMPLE 3 | 35 | 1200 | 98.8 | 1100 | 98.0 |

In comparative example 2, since no ultraviolet ray absorbing agent (formula (8)) was added to the alignment film, the VHR was lowered to 92% by the exposure with the LED. Since ultraviolet rays are also included in the light emitted from the blue LED and since the alignment film and the liquid crystal layer are directly exposed with the ultraviolet rays, it is presumed that deterioration occurs in the alignment film and the liquid crystal layer to cause the lowering of the VHR. Moreover, with respect to the contrast in comparative example 2, since its azobenzene functional group is directly exposed by the ultraviolet rays, it is presumed that the contrast was lowered due to disturbance of the alignment of liquid crystal molecules.

Moreover, in comparative example 3, since the amount of addition of the ultraviolet-ray absorbing agent in the alignment film was set to 35% by mass and since aggregation of the ultraviolet-ray absorbing agent was started to occur in the alignment film, it is presumed that light scattering occurred to cause the lowering in the contrast.

As described above, it is confirmed that by adding the ultraviolet-ray absorbing agent into the alignment film at a ratio of 0% by mass or more to 35% by mass or less, the lowering of the VHR and contrast can be suppressed even when exposed with the blue LED, in the liquid crystal panels (liquid crystal cells) of examples 3 to 5.

Example 6

The same array substrate for the FFS mode as that of example 1 and a CF substrate for the FFS mode using quantum dots were prepared. On these paired substrates, no alignment films of conventional type (polyimide-based alignment films) were formed. On the inner surface side of the array substrate, a seal member for ODF in an uncured state (ultraviolet curing sealing member) was drawn into a lattice shape by using a dispenser. Moreover, a negative-type liquid crystal material containing a monomer to be described later was dripped at predetermined positions on the inner surface side of the CF substrate.

The negative-type liquid crystal material containing a monomer includes a monomer having a chalcone group indicated by the chemical formula (7) at a ratio of 1.2% by mass, and also includes a monomer having an ultraviolet-ray absorbing function (ultraviolet-ray absorbing functional group) indicated by the following chemical formula (2-1) at a ratio of 0.05% by mass. Moreover, the Tni of the negative-type liquid crystal material containing a monomer was set to 85° C., Δε thereof was adjusted to −3.5 and Δn thereof was adjusted to 0.095.

[C9]

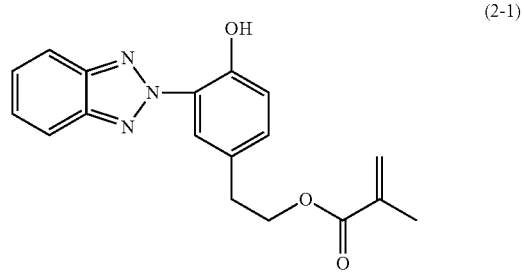

(2-1)

Successively, the array substrate and the CF substrate were bonded to each other under vacuum to form a stacked body, and by irradiating the seal member of the stacked body with ultraviolet ray, the seal member was optically cured. Successively, from the outside of the array substrate, the stacked body was irradiated with a polarizing UV ray under a condition of 5 J/cm$^2$ (wavelength: 365 nm) in a heated state of the stacked body at 95° C. so that horizontal alignment control layers were respectively formed on the inside of the array substrate and the inside of the CF substrate, thereby obtaining a liquid crystal cell for the FFS mode of example 6. By affixing a polarizing plate onto the outside of the array substrate of the liquid crystal cell, a liquid crystal panel of example 6 was manufactured.

Examples 7 to 9 and Comparative Example 4

The same processes as those of example 6 were carried out except that the amount of addition of the monomer provided with an ultraviolet-ray absorbing function (ultraviolet-ray absorbing functional group) indicated by formula (2-1) was altered to values shown in table 3, negative-type liquid crystal materials of examples 7 to 9 as well as comparative example 4 were manufactured. Moreover, the same processes as those of example 6 were carried out except that the negative-type liquid crystal material of examples 7 to 9 as well as comparative example 4 were used in place of the negative-type liquid crystal material containing a monomer of example 6, thereby obtaining liquid crystal cells of examples 7 to 9 as well as comparative example 4.

Blue LED Exposure Test

The same blue LED exposure test as that of the example 3 was carried out on each of the liquid crystal cells of examples 7 to 9 as well as comparative example 4. The results were shown in table 3.

TABLE 3

| | AMOUNT OF INTRODUCTION (wt %) OF MONOMER OF CHEMICAL FORMULA (2-1) | 0 HOUR | | 1000 HOURS LATER | |
|---|---|---|---|---|---|
| | | CONTRAST | VHR (%) | CONTRAST | VHR (%) |
| COMPARATIVE EXAMPLE 4 | 0 | 1380 | 98.6 | 1220 | 90.3 |
| EXAMPLE 6 | 0.05 | 1380 | 98.4 | 1250 | 92.1 |
| EXAMPLE 7 | 0.1 | 1400 | 98.4 | 1300 | 96.0 |
| EXAMPLE 8 | 0.2 | 1440 | 98.3 | 1300 | 96.1 |
| EXAMPLE 9 | 0.3 (PARTIALLY INSOLUBLE) | 1380 | 98.3 | 1290 | 95.7 |

In each of the liquid crystal cells of examples 6 to 9, no alignment film of the conventional type was installed, and by utilizing the film (horizontal alignment control layer) formed by the polymerization of the monomer, horizontal alignment control of liquid crystal molecules was carried out. The results of examples 6 to 9 showed that as the concentration of the monomer provided with the ultraviolet-ray absorbing function indicated by formula (2-1) increases, the lowering of the VHR after exposure by blue LED is suppressed. Additionally, in example 9, the monomer was not completely dissolved in the negative-type liquid crystal material. For this reason, even when the amount of the monomer to be added to the negative-type liquid crystal material was increased to 0.2% by mass or more, further improvement of the VHR after exposure by blue LED was not confirmed. In contrast, in the case of the liquid crystal cell of comparative example 4, since no component derived from the monomer having the ultraviolet-ray absorbing function indicated by formula (2-1) was contained in the horizontal alignment control layer, the VHR was further lowered to about 90% by exposure by the blue LED. As described above, it is confirmed that by introducing a component derived from the monomer having the ultraviolet-ray absorbing function into the horizontal alignment control layer, the lowering of the VHR and the lowering of the contrast can be suppressed in the liquid crystal cells of examples 6 to 9 even when exposed by the blue LED.

Example 10

The same array substrate for the FFS mode as that of example 1 and a CF substrate for the FFS mode using quantum dots were prepared. On these paired substrates, no alignment film (polyimide based alignment film) of the conventional type was formed. On the inner surface side of the array substrate, a seal member for ODF (One Drop Fill) in an uncured state (ultraviolet-ray curing seal member) was drawn in a lattice shape by utilizing a dispenser. Next, a positive-type liquid crystal material containing a monomer to be described later was dripped at predetermined positions on the inner surface side of the CF substrate.

The positive-type liquid crystal material containing a monomer contained a monomer having an azobenzene group indicated by the following chemical formula (10) at a rate of 1.2% by mass, and also contained a monomer having an ultraviolet-ray absorbing function indicated by the aforementioned chemical formula (2-1) at a rate of 0.1% by mass. Moreover, the Tni of the positive-type liquid crystal material containing a monomer was adjusted to 85° C., Δε thereof was adjusted to 7.5 and Δn thereof was adjusted to 0.095.

[C10]

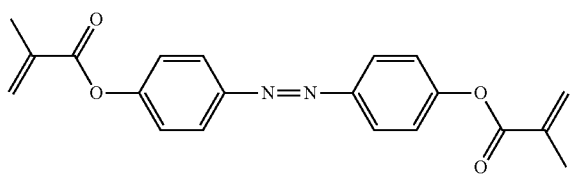

(10)

Next, the array substrate and the CF substrate were bonded to each other under vacuum to form a stacked body, and by irradiating the seal member of the stacked body with ultraviolet ray, the seal member was optically cured. Successively, from the outside of the array substrate, the stacked body was irradiated with a polarizing UV ray under a condition of 5 J/cm² (wavelength: 365 nm) in a heated state of the stacked body at 95° C. so that horizontal alignment control layers were respectively formed on the inside of the array substrate and the inside of the CF substrate, thereby obtaining a liquid crystal cell for the FFS mode of example 10. By affixing a polarizing plate onto the outside of the array substrate of the liquid crystal cell, a liquid crystal panel of example 10 was manufactured.

Examples 11, 12 and Comparative Examples 5, 6

The same processes as those of example 10 were carried out except that the amount of addition of the monomer provided with an ultraviolet-ray absorbing function indicated by the formula (2-1) was altered to values indicated by table 4 so that respective positive-type liquid crystal materials of examples 11 and 12 as well as comparative examples 5 and 6 were obtained. Moreover, the same processes as those of example 10 were carried out except that in place of the positive-type liquid crystal material containing a monomer of example 10, the respective positive-type liquid crystal materials of examples 11 and 12 as well as comparative examples 5 and 6 were used so that liquid crystal panels of examples 11 and 12 as well as comparative examples 5 and 6 were manufactured.

Blue LED Exposure Test

The same blue LED exposure test as that of the example 3 was carried out on the respective liquid crystal panels of examples 11 and 12 as well as comparative examples 5 and 6. The results were shown in table 4.

of the monomer having the ultraviolet-ray absorbing function in the horizontal alignment control layer, the degree (alignment degree) of the horizontal alignment control of liquid crystal molecules by the horizontal alignment layer was lowered. As described above, it is confirmed that by introducing the monomer having the ultraviolet-ray absorbing function to the positive-type liquid crystal material at a rate of less than 0.4% by mass, the lowering of the VHR and contrast in liquid crystal cells can be suppressed, even when exposed by the blue LED.

Example 13

An array substrate for the VA mode constituted by a TFT, pixel electrodes and the like formed on a glass substrate and a CF substrate for the VA mode in which a color conversion layer containing quantum dots, a transparent layer, opposing electrodes opposed to the pixel electrodes and an inner cell polarizing layer and the like are formed on a glass substrate, were prepared. The pixel electrodes of the array substrate and the opposing electrodes of the CF substrate are made of ITO. In the same manner as in example 1, the color conversion layer of the CF substrate is constituted by a red conversion layer containing quantum dots for converting blue light to red light and a green conversion layer contain-

TABLE 4

|  | AMOUNT OF INTRODUCTION (wt %) OF MONOMER OF CHEMICAL FORMULA (2-1) | 0 HOUR | | 1000 HOURS LATER | |
| --- | --- | --- | --- | --- | --- |
|  |  | CONTRAST | VHR (%) | CONTRAST | VHR (%) |
| COMPARATIVE EXAMPLE 5 | 0 | 1200 | 99.0 | 1060 | 92.8 |
| EXAMPLE 10 | 0.1 | 1200 | 99.0 | 1130 | 97.1 |
| EXAMPLE 11 | 0.2 | 1200 | 98.8 | 1180 | 97.3 |
| EXAMPLE 12 | 0.3 | 1170 | 98.8 | 1180 | 98.0 |
| COMPARATIVE EXAMPLE 6 | 0.4 | 1060 | 98.9 | 970 | 98.0 |

The liquid crystal cells of examples 10 to 12 were provided with liquid crystal layers made of a positive-type liquid crystal material and also provided with horizontal alignment control layers containing a component derived from a monomer having an ultraviolet-ray absorbing function indicated by chemical formula (2-1). Since the liquid crystal cell of comparative example 4 contained no component derived from the monomer having the ultraviolet-ray absorbing function in the horizontal alignment control layer, the VHR was further lowered to about 90% after exposure by the blue LED, even in the case when the positive-type liquid crystal material was used. This is presumably caused by degradation in the liquid crystal material and horizontal alignment control layer due to blue light and ultraviolet rays emitted from the blue LED. Moreover, as indicated by table 4, as the amount of addition of the monomer increased, the lowering of the VHR after exposure by blue LED was greatly suppressed. However, as the concentration of the monomer increases, the contrast of the test initiation time (0 hour) in the initial state tends to be lowered. In particular, in comparative example 6, the contrast in the initial state was lowered down to 1060. This is presumably because the introduction rate of the monomer of the chemical formula (10) having the horizontal alignment control function was lowered in accordance with the increase of the concentration ing quantum dots for converting blue light to green light. The transparent layer is made of a transparent resin that allows blue light, as it is, to transmit.

Of these paired substrates, only on the inner surface side of the array substrate, an alignment agent for a polyamic acid-based vertical alignment film formed by adding the ultraviolet ray absorbing agent indicated by the chemical formula (8) is applied at a rate of 10% by mass relative to the entire solid component by using a spin coating method. The coated object was subjected to a temporary baking treatment in which it was baked at 90° C. for two minutes, and successively subjected to a main baking treatment in which it was baked at 200° C. for 40 minutes. In this manner, an alignment film (polyamic acid-based vertical alignment film) was formed on the array substrate.

Successively, on the inner surface side of the array substrate, a seal member for ODF (One Drop Fill) in an uncured state (ultraviolet-ray curing seal member) was drawn in a lattice shape by utilizing a dispenser. Next, a negative-type liquid crystal material containing a monomer to be described later was dripped at predetermined positions on the inner surface side of the CF substrate.

The negative-type liquid crystal material containing a monomer contained a monomer having a vertical alignment group indicated by the following chemical formula (1) at a rate of 3.0% by mass, and also contained a monomer indicated by the following chemical formula (12) at a rate of 0.3% by mass. Moreover, the Tni of the negative-type liquid crystal material containing a monomer was adjusted to 85° C., Δε thereof was adjusted to −3.5 and Δn thereof was adjusted to 0.095.

[C11]

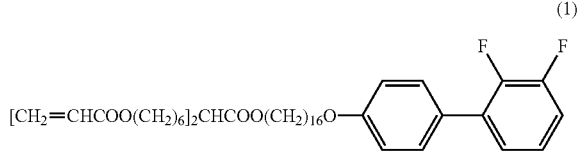

(1)

[C12]

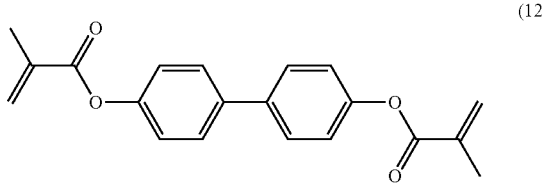

(12)

Thereafter, the array substrate and the CF substrate were bonded to each other under vacuum to form a stacked body, and by irradiating the seal member of the stacked body with ultraviolet ray, the seal member was optically cured. Successively, from the outside of the array substrate, the stacked body was irradiated with a non-polarizing UV ray under a condition of 2 J/cm$^2$ (wavelength: 365 nm) so that vertical alignment control layers were respectively formed on the inside of the array substrate and the inside of the CF substrate, thereby obtaining a liquid crystal cell for the VA mode of example 13. By affixing a polarizing plate onto the outside of the array substrate of the liquid crystal cell, a liquid crystal panel of example 13 was manufactured.

Examples 14, 15 and Comparative Examples 7, 8

The same processes as those of example 13 were carried out except that the amount of addition of an ultraviolet ray absorbing agent indicated by the chemical formula (8) was altered to values indicated by table 5 so that respective alignment agents of examples 14 and 15 as well as comparative examples 7 and 8 were manufactured. Moreover, the same processes as those of example 13 were carried out except that in place of the alignment agent of comparative example 13, the respective alignment agents of examples 14 and 15 as well as comparative examples 7 and 8 were used so that liquid crystal panels of examples 14 and 15 as well as comparative examples 7 and 8 were manufactured.

Blue LED Exposure Test

The same blue LED exposure test as that of the example 3 was carried out on the respective liquid crystal panels of examples 14 and 15 as well as comparative examples 7 and 8. The results were shown in table 5.

TABLE 5

| | AMOUNT OF INTRODUCTION (wt %) OF ULTRAVIOLET-RAY ABSORBING AGENT OF CHEMICAL FORMULA (8) | 0 HOUR | | 1000 HOURS LATER | |
|---|---|---|---|---|---|
| | | CONTRAST | VHR (%) | CONTRAST | VHR (%) |
| COMPARATIVE EXAMPLE 7 | 0 | 3500 | 98.6 | 2600 | 90.8 |
| EXAMPLE 13 | 10 | 3500 | 98.8 | 3300 | 97.0 |
| EXAMPLE 14 | 20 | 3550 | 99.0 | 3300 | 97.2 |
| EXAMPLE 15 | 30 | 3200 | 98.9 | 3200 | 97.6 |
| COMPARATIVE EXAMPLE 8 | 35 | 2400 | 98.5 | 1900 | 97.7 |

Comparative example 7 showed a configuration in which the ultraviolet ray absorbing agent indicated by chemical formula (8) was not introduced into the vertical alignment film, and as shown in table 5, the VHR was lowered down to about 90% by exposure to blue LED. This is presumably because since light from the blue LED contains ultraviolet rays together with blue light, the vertical alignment film and liquid crystal layer were directly exposed by the ultraviolet rays, degradation occurred in the vertical alignment film and the liquid crystal molecules, with the result that the VHR was lowered. Moreover, with respect to the contrast also, it is presumed that since the vertical aligning group of the vertical alignment control layer was directly exposed by the ultraviolet rays, the vertical aligning property is lowered. In contrast, comparative example 8 shows a configuration in which the ultraviolet-ray absorbing agent is introduced into the vertical alignment film at a rate of 35% by mass. In comparative example 8, since aggregation of the ultraviolet-ray absorbing agent was started to occur in the alignment film, it is presumed that light scattering occurred to cause the lowering in the contrast. As described above, in the liquid crystal cell in the vertical alignment mode also, it is confirmed that by setting the amount of introduction (ratio of introduction) of the ultraviolet-ray absorbing agent into the alignment film at a ratio of 0% by mass or more to less than 35% by mass, the lowering of the VHR and contrast can be suppressed even when exposed with the blue LED as indicated by the results of examples 13 to 15.

Example 16

The same array substrate for the VA mode and the same CF substrate for the VA mode using quantum dots as those of example 13 were prepared. On these paired substrates, no alignment film (polyimide-based alignment film) of the conventional type was formed. On the inner surface side of the array substrate, a seal member for DF in an uncured state (ultraviolet-ray curing seal member) was drawn in a lattice shape by utilizing a dispenser. Moreover, a negative-type liquid crystal material containing a monomer to be described later was dripped at predetermined positions on the inner surface side of the CF substrate.

The negative-type liquid crystal material containing a monomer contained a monomer having a vertical alignment group indicated by the chemical formula (1) at a rate of 3% by mass, a monomer indicated by the chemical formula (12) at a rate of 0.3% by mass and a monomer having an ultraviolet-ray absorbing function indicated by the following chemical formula (2-2) at a rate of 0.05% by mass. Moreover, the Tni of the negative-type liquid crystal material containing a monomer was adjusted to 85° C., Δε thereof was adjusted to −3.5 and Δn thereof was adjusted to 0.095.

[C13]

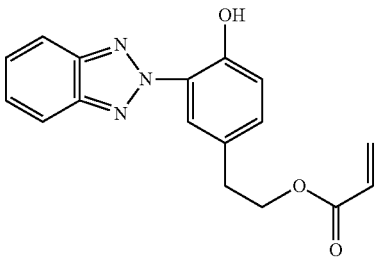

(2-2)

Thereafter, the array substrate and the CF substrate were bonded to each other under vacuum to form a stacked body, and by irradiating the seal member of the stacked body with ultraviolet ray, the seal member was optically cured. Successively, from the outside of the array substrate, the stacked body was irradiated with a non-polarizing UV ray under a condition of 2 J/cm$^2$ (wavelength: 365 nm) so that vertical alignment control layers were respectively formed on the inside of the array substrate and the inside of the CF substrate, thereby obtaining a liquid crystal cell for the VA mode of example 16. By affixing a polarizing plate onto the outside of the array substrate of the liquid crystal cell, a liquid crystal panel of example 16 was manufactured.

Examples 17 to 19, and Comparative Example 9

The same processes as those of example 16 were carried out except that the amount of addition of an ultraviolet ray absorbing agent indicated by the chemical formula (2-2) was altered to values indicated by table 6 so that respective negative-type liquid crystal materials of examples 17 to 19 as well as comparative example 9 were manufactured. Moreover, the same processes as those of example 16 were carried out except that in place of the negative-type liquid crystal material of example 16, the respective negative-type liquid crystal materials of examples 17 to 19 as well as comparative example 9 were used so that liquid crystal panels of examples 17 to 19 as well as comparative example 9 were manufactured.

Blue LED Exposure Test

The same blue LED exposure test as that of the example 3 was carried out on the respective liquid crystal panels of examples 16 to 19 as well as comparative example 9. The results were shown in table 6.

TABLE 6

| | AMOUNT OF INTRODUCTION (wt %) OF MONOMER OF CHEMICAL FORMULA (2-2) | 0 HOUR | | 1000 HOURS LATER | |
|---|---|---|---|---|---|
| | | CONTRAST | VHR (%) | CONTRAST | VHR (%) |
| COMPARATIVE EXAMPLE 9 | 0 | 3400 | 98.8 | 2400 | 87.5 |
| EXAMPLE 16 | 0.05 | 3440 | 98.9 | 2900 | 94.0 |
| EXAMPLE 17 | 0.1 | 3400 | 98.9 | 3000 | 95.5 |
| EXAMPLE 18 | 0.2 | 3150 | 98.5 | 3000 | 96.7 |
| EXAMPLE 19 | 0.3 | 2750 | 98.1 | 2400 | 96.5 |

TABLE 6-continued

| AMOUNT OF INTRODUCTION (wt %) OF MONOMER OF CHEMICAL FORMULA (2-2) | 0 HOUR | | 1000 HOURS LATER | |
|---|---|---|---|---|
| | CONTRAST | VHR (%) | CONTRAST | VHR (%) |
| (PARTIALLY INSOLUBLE) | | | | |

The respective liquid crystal cells of examples 16 to 19 as well as comparative example 9 had no vertical alignment film of the conventional type, and vertical alignment control of liquid crystal molecules was carried out by using only the vertical alignment control layer made of a film formed by polymerization of a monomer. Comparative example 9 showed a configuration in which a monomer having an ultraviolet-ray absorbing function indicated by the chemical formula (2-2) was not contained in the negative-type liquid crystal material (that is, a component derived from a monomer having the ultraviolet-ray absorbing function was not contained in the vertical alignment control layer). In this comparative example 9, the VHR was lowered down to less than 90% by exposure by the blue LED. Moreover, as shown in Table 6, as the concentration of the monomer having the ultraviolet-ray absorbing function increased, the degradation of the VHR after exposure by the blue LED was suppressed (see examples 16 to 18). However, in example 19, the monomer having the ultraviolet-ray absorbing function was not completely dissolved in the negative-type liquid crystal material. For this reason, even when the amount of the monomer to be added to the negative-type liquid crystal material was set to 0.2% by mass or more, further improvements of the VHR after exposure by the blue LED were not recognized. As described above, it is confirmed that even in the case of the vertical alignment mode, by introducing a monomer having an ultraviolet-ray absorbing function indicated by the aforementioned chemical formula (2-2) into the vertical alignment control layer, the degradation of the VHR and contrast can be made smaller even after the exposure by the blue LED.

The invention claimed is:

1. A liquid crystal cell comprising:
a color filter substrate including a color conversion layer for converting color of light but not include an alignment film having polyamic acid or polyimide;
an array substrate opposed to the color filter substrate disposed such that the color conversion layer is on an inner side;
a liquid crystal layer interposed between the color filter substrate and the array substrate, the liquid crystal layer including liquid crystal molecules; and
two alignment control layers formed on an inner surface of the color filter substrate and an inner surface of the array substrate, respectively, the alignment control layers contacting the liquid crystal layer and being made of reactants of radical polymerizable monomers added to a liquid crystal material for forming the liquid crystal layer to control orientations of the liquid crystal molecules, the radical polymerizable monomers including a radical polymerizable monomer having an ultraviolet-ray absorbing functional group and a radical polymerizable monomer having a horizontal aligning light functional group, wherein the ultraviolet-ray absorbing functional group is a benzotriazole group and the horizontal aligning light functional group is a functional group having a chalcone group or an azobenzene group.

2. The liquid crystal cell according to claim 1, wherein the color conversion layer includes a red conversion layer containing quantum dots for converting blue light to red light and a green conversion layer containing quantum dots for converting blue light to green light, and
the color filter substrate includes not only the red conversion layer and the green conversion layer but also a transparent layer for transmitting blue light without conversion.

3. The liquid crystal cell according to claim 1, wherein the array substrate includes an alignment film disposed below the alignment control layer, the alignment film containing polyamic acid or polyimide.

4. The liquid crystal cell according to claim 3, wherein the alignment film includes a light aligning functional group.

5. The liquid crystal cell according to claim 3, wherein the alignment film includes an ultraviolet-ray absorbing agent.

6. The liquid crystal cell according to claim 5, wherein the ultraviolet-ray absorbing agent is a benzotriazole-based compound.

7. The liquid crystal cell according to claim 1, wherein the radical polymerizable monomer having the benzotriazole group includes compounds expressed by chemical formula (2-1) or formula (2-2) provided below:

[C2]

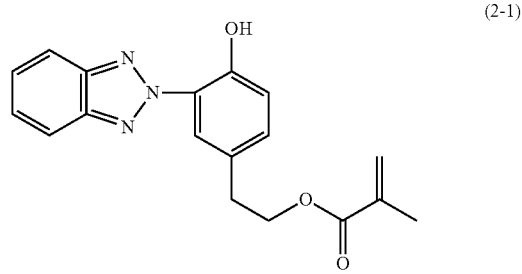

(2-1)

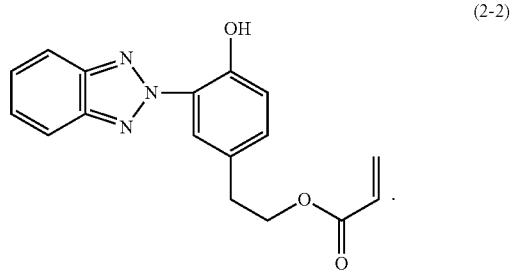

(2-2)

8. The liquid crystal cell according to claim 1, wherein
the color filter substrate includes a transparent support substrate, the color conversion layer disposed on the support substrate, and a polarizing layer disposed on the color conversion layer, and
the liquid crystal cell further comprises a polarizing plate disposed on outer than the array substrate and used as a pair with the polarizing layer.

9. A liquid crystal display device comprising:
the liquid crystal cell according to claim 1; and
a backlight device including a light source configured to emit blue light for supplying the blue light to the liquid crystal cell.

\* \* \* \* \*